US010431962B2

(12) United States Patent
Kato et al.

(10) Patent No.: US 10,431,962 B2
(45) Date of Patent: Oct. 1, 2019

(54) SPARK PLUG

(71) Applicant: NGK SPARK PLUG CO., LTD., Nagoya-shi, Aichi (JP)

(72) Inventors: Taku Kato, Nagoya (JP); Yohei Kozakai, Nagoya (JP)

(73) Assignee: NGK SPARK PLUG CO., LTD., Nagoya-shi, Aichi (JP)

( * ) Notice: Subject to any disclaimer, the term of this patent is extended or adjusted under 35 U.S.C. 154(b) by 0 days.

(21) Appl. No.: 16/341,121

(22) PCT Filed: Jul. 10, 2017

(86) PCT No.: PCT/JP2017/025114
§ 371 (c)(1),
(2) Date: Apr. 11, 2019

(87) PCT Pub. No.: WO2018/074016
PCT Pub. Date: Apr. 26, 2018

(65) Prior Publication Data
US 2019/0237944 A1 Aug. 1, 2019

(30) Foreign Application Priority Data

Oct. 20, 2016 (JP) .................................. 2016-206321

(51) Int. Cl.
| | |
|---|---|
| *H01T 13/39* | (2006.01) |
| *H01T 13/02* | (2006.01) |
| *B23K 35/30* | (2006.01) |
| *C22C 38/04* | (2006.01) |

(52) U.S. Cl.
CPC .......... *H01T 13/39* (2013.01); *B23K 35/3053* (2013.01); *C22C 38/04* (2013.01); *H01T 13/02* (2013.01)

(58) Field of Classification Search
CPC ......... H01T 13/39; H01T 13/02; H01T 13/20; H01T 13/36; H01T 13/12; C22C 38/04; B23K 35/3053
See application file for complete search history.

(56) References Cited

U.S. PATENT DOCUMENTS

| | | | |
|---|---|---|---|
| 6,373,173 | B1 | 4/2002 | Suzuki |
| 8,072,125 | B2 * | 12/2011 | Torii ....................... H01T 13/20 |
| | | | 313/11.5 |
| 2017/0077681 | A1 * | 3/2017 | Kozakai .................. H01T 13/20 |

FOREIGN PATENT DOCUMENTS

| | | |
|---|---|---|
| JP | 63-145754 A | 6/1988 |
| JP | 63-266046 A | 11/1988 |
| JP | 2000-215963 A | 8/2000 |

OTHER PUBLICATIONS

International Search Report from corresponding International Patent Application No. PCT/JP17/25114, dated Aug. 1, 2017.

* cited by examiner

*Primary Examiner* — Joseph L Williams
*Assistant Examiner* — Jose M Diaz
(74) *Attorney, Agent, or Firm* — Kusner & Jaffe (57) ABSTRACT

An ignition plug includes a metallic shell containing iron as a main component, carbon in an amount of 0.20 wt. % to 0.30 wt. %, manganese in an amount of 0.30 wt. % to 0.45 wt. %, and sulfur in an amount of 0.005 wt. % to 0.009 wt. %. The ratio of the manganese content (wt. %) to the sulfur content (wt. %); i.e., Mn/S is 40 to 65.

5 Claims, 5 Drawing Sheets

| No. | COMPOSITION OF MATERIAL (wt%) | | | Mn/S | EVALUATION OF BREAKAGE | EVALUATION OF RODUC-TIVIT | COMPRE-HENSIVE EVALUATION |
|---|---|---|---|---|---|---|---|
| | C | Mn | S | | | | |
| A1 | 0.18 | 0.50 | 0.012 | 41.7 | A | A | A |
| A2 | | 0.34 | 0.009 | 37.8 | A | A | A |
| A3 | 0.20-0.30 | 0.49 | 0.014 | 35.0 | B | A | B |
| A4 | | 0.45 | 0.011 | 40.9 | B | A | B |
| A5 | | 0.26 | 0.012 | 21.7 | B | A | B |
| A6 | | 0.40 | 0.011 | 36.4 | B | A | B |
| A7 | | 0.45 | 0.009 | 50.0 | A | A | A |
| A8 | | 0.30 | 0.007 | 42.9 | A | A | A |
| A9 | | 0.25 | 0.004 | 62.5 | A | B | B |
| A10 | | 0.39 | 0.006 | 65.0 | A | A | A |
| A11 | | 0.33 | 0.006 | 55.0 | A | A | A |
| A12 | | 0.38 | 0.004 | 95.0 | A | B | B |
| A13 | | 0.31 | 0.007 | 44.3 | A | A | A |
| A14 | | 0.51 | 0.012 | 42.5 | B | A | B |
| A15 | | 0.42 | 0.012 | 35.0 | B | A | B |
| A16 | | 0.30 | 0.014 | 21.4 | B | A | B |
| A17 | | 0.28 | 0.012 | 23.3 | B | A | B |
| A18 | | 0.32 | 0.009 | 35.6 | B | A | B |
| A19 | | 0.32 | 0.005 | 64.0 | A | A | A |
| A20 | | 0.29 | 0.009 | 32.2 | B | A | B |
| A21 | | 0.51 | 0.004 | 127.5 | B | A | B |
| A22 | | 0.37 | 0.008 | 46.3 | A | A | A |
| A23 | | 0.32 | 0.008 | 40.0 | A | A | A |
| A24 | 0.35 | 0.35 | 0.008 | 43.8 | B | A | B |
| A25 | | 0.40 | 0.006 | 66.7 | B | A | B |

FIG. 3

(MATERIAL: A3) — T2

| No. | L (mm) | EVALUATION OF FIRST TEST | EVALUATION OF SECOND TEST |
|---|---|---|---|
| B1 | 24 | A | A |
| B2 | 26 | B | A |
| B3 | 28 | C | A |
| B4 | 30 | C | A |
| B5 | 32 | C | A |
| B6 | 34 | C | B |
| B7 | 36 | C | C |
| B8 | 38 | C | C |
| B9 | 40 | C | C |
| B10 | 42 | C | C |

FIG. 4(A)

(MATERIAL: A22) — T3

| No. | L (mm) | EVALUATION OF FIRST TEST | EVALUATION OF SECOND TEST |
|---|---|---|---|
| C1 | 24 | A | A |
| C2 | 26 | A | A |
| C3 | 28 | A | A |
| C4 | 30 | A | A |
| C5 | 32 | A | A |
| C6 | 34 | A | A |
| C7 | 36 | B | A |
| C8 | 38 | B | A |
| C9 | 40 | B | B |
| C10 | 42 | C | C |

FIG. 4(B)

(MATERIAL: A3)　　　　　　　　　　　　　　　T4

| No. | THREAD DIA. (mm) | T(mm) | BREAKAGE PERCENT (%) | EVALUATION |
|---|---|---|---|---|
| D1 | 8 | 0.55 | 12 | B |
| D2 | 10 | 0.62 | 18 | B |
| D3 | 12 | 0.7 | 15 | B |
| D4 | 14 | 0.8 | 0 | A |

FIG. 5(A)

(MATERIAL: A22)　　　　　　　　　　　　　　T5

| No. | THREAD DIA. (mm) | T(mm) | BREAKAGE PERCENT (%) | EVALUATION |
|---|---|---|---|---|
| E1 | 8 | 0.55 | 0 | A |
| E2 | 10 | 0.62 | 0 | A |
| E3 | 12 | 0.7 | 0 | A |
| E4 | 14 | 0.8 | 0 | A |

FIG. 5(B)

SPARK PLUG

FIELD OF THE INVENTION

The present specification relates to an ignition plug.

BACKGROUND OF THE INVENTION

An ignition plug is used to ignite an air-fuel mixture in a combustion chamber of, for example, an internal combustion engine. The ignition plug includes, for example, a tubular metallic shell, and an insulator disposed around the inner circumference of the metallic shell.

A reduction in the diameter of an ignition plug is desired for improving the degree of freedom for design of an internal combustion engine. A reduction in ignition plug diameter, however, may cause problems during production of a metallic shell; for example, insufficient strength of the metallic shell. Chips generated during production of the metallic shell may deposit on a tool, resulting in low productivity.

The present specification discloses a technique for preventing a reduction in the strength of a metallic shell and a reduction in productivity.

SUMMARY OF THE INVENTION

The present specification discloses, for example, the following application examples.

APPLICATION EXAMPLE 1

In accordance with a first aspect of the present invention there is provided an ignition plug comprising:

a tubular metallic shell extending in a direction of an axial line, wherein the metallic shell contains iron as a main component, carbon in an amount of 0.20 wt. % to 0.30 wt. %, manganese in an amount of 0.30 wt % to 0.45 wt. %, and sulfur in an amount of 0.005 wt. % to 0.009 wt. %, and the ratio of the manganese content (wt. %) to the sulfur content (wt. %), the ratio being represented by Mn/S, is 40 to 65.

This configuration can prevent a reduction in the strength of the metallic shell and a reduction in productivity.

APPLICATION EXAMPLE 2

In accordance with a second aspect of the present invention there is provided an ignition plug according to application example 1, wherein the metallic shell has, on an outer circumferential surface thereof, a seating surface protruding radially outward and a threaded portion provided on a forward end side of the seating surface in the direction of the axial line, and the distance, in the direction of the axial line, between a forward-end portion of the seating surface and a forward end of the metallic shell is 26 mm to 40 mm.

A long metallic shell in which the distance between the seating surface and the forward end is 26 mm or more can be appropriately used because a reduction in the strength of the metallic shell and a reduction in productivity are prevented.

APPLICATION EXAMPLE 3

In accordance with a third aspect of the present invention there is provided an ignition plug according to application example 2, wherein the distance is 34 mm to 40 mm.

A long metallic shell in which the distance between the seating surface and the forward end is 34 mm or more can be appropriately used because a reduction in the strength of the metallic shell and a reduction in productivity are prevented.

APPLICATION EXAMPLE 4

In accordance with a fourth aspect of the present invention there is provided an ignition plug according to application example 2 or 3, wherein the threaded portion has a nominal diameter of M12, M10, or M8.

A metallic shell which has a thin threaded portion having a nominal diameter of M12, M10, or M8 can be appropriately used because a reduction in the strength of the metallic shell and a reduction in productivity are prevented.

The technique disclosed in the present specification can be implemented in various forms; for example, a metallic shell for an ignition plug, an ignition plug including the metallic shell, an ignition apparatus including the ignition plug, an internal combustion engine including the ignition plug, and an internal combustion engine equipped with the ignition apparatus including the ignition plug.

DETAILED DESCRIPTION OF THE INVENTION

Figure 1:
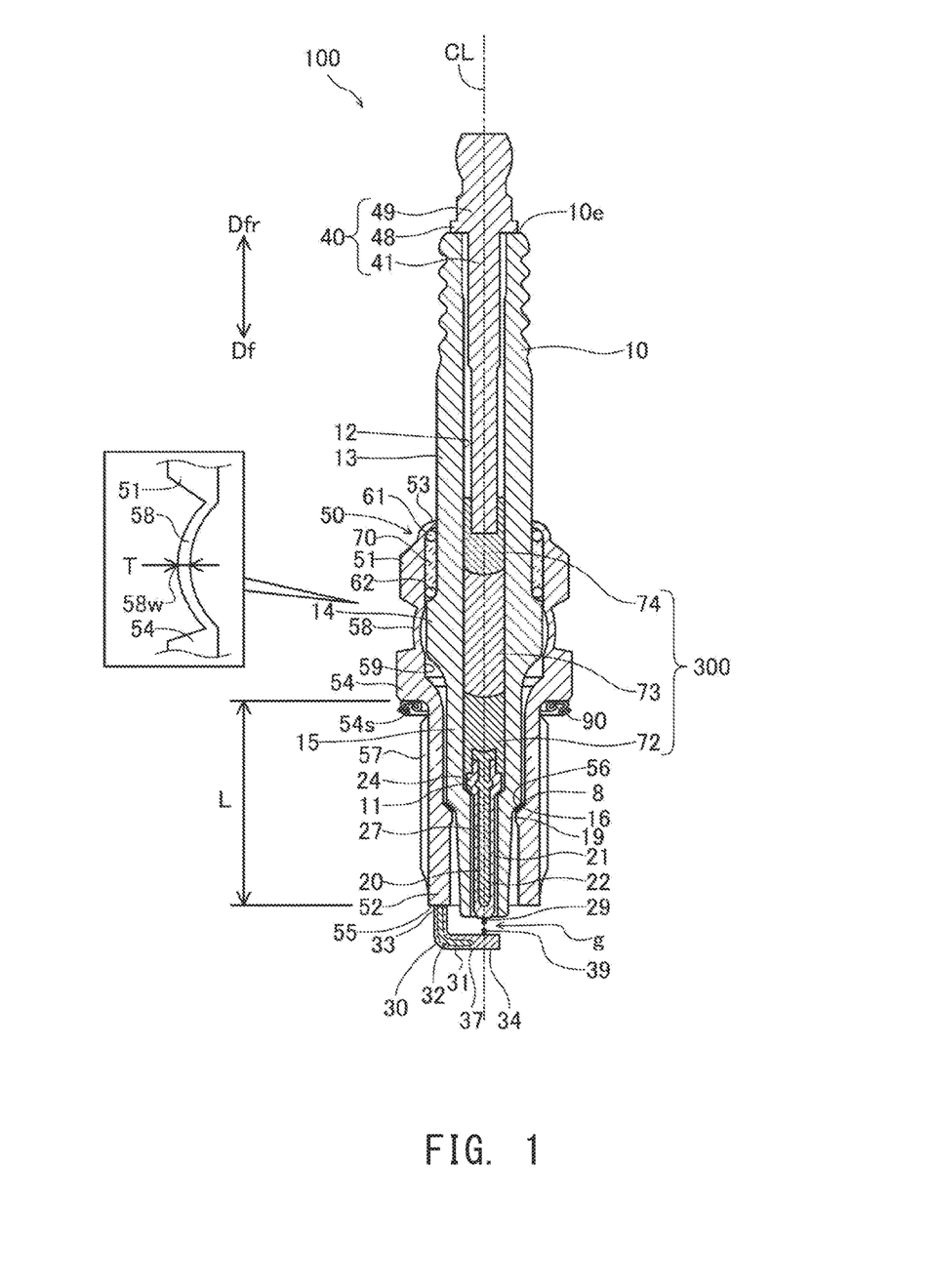
FIG. 1 is a sectional view of an ignition plug 100 which is one embodiment.

A. Embodiment:

A-1. Configuration of Ignition Plug 100:

FIG. 1 is a sectional view showing an ignition plug 100 which is one embodiment. The drawing illustrates a center axis CL (may also be called "axial line CL") of the ignition plug 100, and a flat section of the ignition plug 100 including the center axis CL. Hereinafter, a direction in parallel with the center axis CL is also called the "direction of the axial line CL" or called merely the "axial direction" or the "forward-rearward direction." A direction perpendicular to the axial line CL is also called a "radial direction." Regarding the direction in parallel with the center axis CL, the downward direction in FIG. 1 is called a forward-end direction Df or a forward direction Df, and the upward direction is called a rear-end direction Dfr or a rearward direction Dfr. The forward-end direction Df is directed from a metal terminal member 40 toward a center electrode 20, the metal terminal member 40 and the center electrode 20 being described later. A forward-end direction Df side in FIG. 1 is called a forward-end side of the ignition plug 100, and a rear-end direction Dfr side in FIG. 1 is called a rear-end side of the ignition plug 100.

The ignition plug 100 includes a tubular insulator 10 having a through hole 12 (may also be called an "axial hole 12") extending along the axial line CL; a center electrode 20 held in the through hole 12 at the forward-end side; a metal terminal member 40 held in the through hole 12 at the rear-end side; a resistor 73 disposed within the through hole 12 between the center electrode 20 and the metal terminal member 40; an electrically conductive first seal 72 that is in contact with and electrically connects the center electrode 20 and the resistor 73; an electrically conductive second seal 74 that is in contact with and electrically connects the resistor 73 and the metal terminal member 40; a tubular metallic shell 50 fixed to the outer circumference of the insulator 10; and a ground electrode 30 having one end joined to a forward-end surface 55 of the metallic shell 50 and having the other end facing the center electrode 20 with a gap g provided therebetween.

The insulator 10 has a large-diameter portion 14 having the largest outer diameter and formed at an approximately axial center. The insulator 10 has a rear-end-side trunk portion 13 formed on the rear end side of the large-diameter portion 14. The insulator 10 has a forward-end-side trunk portion 15 formed on the forward end side of the large-diameter portion 14 and having an outer diameter smaller than that of the rear-end-side trunk portion 13. The insulator 10 has an outer-diameter-reducing portion 16 and a leg portion 19 formed on the forward end side of the forward-end-side trunk portion 15 in this order toward the forward-end side. The outer diameter of the outer-diameter-reducing portion 16 gradually reduces in the forward direction Df. The insulator 10 has an inner-diameter-reducing portion 11 formed in the vicinity of the outer-diameter-reducing portion 16 (in the example of FIG. 1, the forward-end-side trunk portion 15) and having an inner diameter that gradually reduces in the forward direction Df. The insulator 10 is preferably formed in consideration of mechanical strength, thermal strength, and electrical strength and is formed through, for example, firing of alumina (another electrically insulating material may be used).

The center electrode 20 is disposed in the through hole 12 of the insulator 10 to be located at the end on the forward direction Df side. The center electrode 20 has a head portion 24, a shaft portion 27 formed on the forward direction Df side of the head portion 24, and a first tip 29 joined (e.g., laser-welded) to the forward end of the shaft portion 27. The outer diameter of the head portion 24 is greater than the inner diameter of a portion of the insulator 10 located on the forward direction Df side of the inner-diameter-reducing portion 11. The surface of the head portion 24 on the forward direction Df side is supported by the inner-diameter-reducing portion 11 of the insulator 10. The shaft portion 27 extends in the forward direction Df in parallel with the axial line CL. The shaft portion 27 has an outer layer 21 and a core 22 disposed on the inner-circumference side of the outer layer 21. The outer layer 21 is formed of, for example, an alloy containing nickel as a main component. The term "main component" as used herein refers to a component having the highest content (wt. %). The core 22 is formed of a material (e.g., an alloy containing copper as a main component) higher in thermal conductivity than the outer layer 21. The first tip 29 is formed of a material (e.g., a noble metal such as iridium (Ir) or platinum (Pt), tungsten (W), or an alloy containing at least one of these metals) superior to the shaft portion 27 in durability against discharge. A portion of the center electrode 20, which portion is located on the forward end side and includes the first tip 29, protrudes from the axial hole 12 of the insulator 10 toward the forward direction Df side. At least one of the core 22 and the first tip 29 may be omitted.

A portion of the metal terminal member 40 on the forward direction Df side is inserted into the rear-end side of the through hole 12 of the insulator 10. The metal terminal member 40 is a rod-like member extending in parallel with the axial line CL. The metal terminal member 40 is formed of an electrically conductive material (e.g., a metal containing iron as a main component). The metal terminal member 40 has a cap attachment portion 49, a collar portion 48, and a shaft portion 41 disposed sequentially in the forward direction Df. The cap attachment portion 49 is disposed outside the axial hole 12 on the rear-end side of the insulator 10. A plug cap connected to a high-voltage cable (not illustrated) is fitted to the cap attachment portion 49 for application of high voltage for generation of spark discharge. The cap attachment portion 49 is an example of a terminal portion to which a high-voltage cable is connected. The shaft portion 41 is inserted into a portion of the axial hole 12 of the insulator 10, which portion is located on the rearward direction Dfr side. The surface of the collar portion 48 on the forward direction Df side is in contact with a rear end 10e (i.e., rearward direction Dfr side end) of the insulator 10.

The resistor 73 is disposed within the axial hole 12 of the insulator 10 to be located between the metal terminal member 40 and the center electrode 20 for reducing electrical noise. The resistor 73 is formed of an electrically conductive material (e.g., a mixture of glass, carbon particles, and ceramic particles). The first seal 72 is disposed between the resistor 73 and the center electrode 20, and the second seal 74 is disposed between the resistor 73 and the metal terminal member 40. These seals 72 and 74 are formed of an electrically conductive material (e.g., a mixture of metal particles and glass which is the same as that contained in the material of the resistor 73). The center electrode 20 is electrically connected to the metal terminal member 40 by means of the first seal 72, the resistor 73, and the second seal 74. Hereinafter, the members 72, 73, and 74, which electrically connect the metal terminal member 40 and the center electrode 20 within the axial hole 12 of the insulator 10, may also be collectively called a connection member 300.

The metallic shell 50 is a tubular member having a through hole 59 extending along the axial line CL. The insulator 10 is inserted into the through hole 59 of the metallic shell 50, and the metallic shell 50 is fixed to the outer circumference of the insulator 10. The metallic shell 50 is formed of an electrically conductive material (e.g., a metal, such as carbon steel containing iron as a main component). A portion of the insulator 10 on the forward direction Df side is exposed to the outside of the through hole 59. Also, a portion of the insulator 10 on the rearward direction Dfr side is exposed to the outside of the through hole 59.

The metallic shell 50 has a tool engagement portion 51 and a trunk portion 52. An ignition plug wrench (not illustrated) is engaged with the tool engagement portion 51. The trunk portion 52 has the forward end surface 55 of the metallic shell 50. The trunk portion 52 has a threaded portion 57 formed on the outer circumferential surface thereof and adapted to be threadingly engaged with a mounting hole of an internal combustion engine (e.g., a gasoline engine). The threaded portion 57 is an external thread and has a spiral thread ridge (not illustrated).

The metallic shell 50 has a flange-like collar portion 54 formed on the outer circumferential surface thereof and between the tool engagement portion 51 and the trunk portion 52. The collar portion 54 protrudes radially outward. An annular gasket 90 is disposed between the collar portion 54 and the threaded portion 57 of the trunk portion 52. The gasket 90 is formed through, for example, folding of a plate-like member of metal. The gasket 90 is crushed and deformed when the ignition plug 100 is mounted to an engine. The deformation of the gasket 90 causes sealing of a gap between the ignition plug 100 (specifically, the surface of the collar portion 54 on the forward direction Df side) and the engine, thereby preventing outward leakage of combustion gas. The surface 54s of the collar portion 54 on the forward direction Df side forms a seating surface that comes into contact with the gasket 90 and presses the gasket 90 in the forward direction Df (hereinafter the surface 54s may also be called "seating surface 54s"). The seating surface 54s protrudes radially outward. The threaded portion 57 is located on the forward direction Df side of the seating surface 54s. The gasket 90 may be omitted. In such a case, the seating surface 54s may come into direct contact with a portion (e.g., an engine head) of the engine where a mounting hole for the ignition plug 100 is formed. This contact seals between the ignition plug 100 and the engine. In any case, the seating surface 54s of the metallic shell 50 may be an outer surface of the metallic shell 50 that protrudes radially outward and faces toward the forward direction Df side and can come into contact with a member (e.g., the gasket 90) disposed between the metallic shell 50 and the engine, or an outer surface of the metallic shell 50 that can come into direct contact with a portion of the engine where a mounting hole is formed (e.g., the rim of the mounting hole). The contact of the seating surface 54s with a member (e.g., the gasket 90) or the engine can seal between the ignition plug 100 and the engine.

The trunk portion 52 of the metallic shell 50 has an inner-diameter-reducing portion 56 having an inner diameter that gradually reduces toward the forward-end side. A forward-end-side packing 8 is disposed between the inner-diameter-reducing portion 56 of the metallic shell 50 and the outer-diameter-reducing portion 16 of the insulator 10. In the present embodiment, the forward-end-side packing 8 is, for example, a plate-like ring made of iron (another material (e.g., a metal material such as copper) may be used).

The metallic shell 50 has a thin crimp portion 53 formed on the rear end side of the tool engagement portion 51. Also, the metallic shell 50 has a thin buckling portion 58 formed between the collar portion 54 and the tool engagement portion 51. Annular ring members 61 and 62 are inserted between an inner circumferential surface of the metallic shell 50 extending from the tool engagement portion 51 to the crimp portion 53 and an outer circumferential surface of the rear-end-side trunk portion 13 of the insulator 10. Powder of talc 70 is charged between these ring members 61 and 62. In the production process of the ignition plug 100, when the crimp portion 53 is bent radially inward for crimping, the buckling portion 58 deforms radially outward (buckles) as a result of application of compressive force thereto. Consequently, the metallic shell 50 and the insulator 10 are fixed together. In this crimping step, the talc 70 is compressed, thereby enhancing the airtightness between the metallic shell 50 and the insulator 10. The packing 8 is pressed between the outer-diameter-reducing portion 16 of the insulator 10 and the inner-diameter-reducing portion 56 of the metallic shell 50, thereby sealing between the metallic shell 50 and the insulator 10.

The ground electrode 30 has a rod-like body portion 37 and a second tip 39 attached to a distal end portion 34 of the body portion 37. One end portion 33 (also called a proximal end portion 33) of the body portion 37 is joined to the forward-end surface 55 of the metallic shell 50 (by resistance welding or a similar technique). The body portion 37 extends in the forward-end direction Df from the proximal end portion 33 joined to the metallic shell 50, is bent toward the center axis CL, and reaches the distal end portion 34. The second tip 39 is fixed (by laser welding or a similar technique) to the surface of the distal end portion 34 on the rearward direction Dfr side. A gap g is provided between the second tip 39 of the ground electrode 30 and the first tip 29 of the electrode 20. Specifically, the second tip 39 of the ground electrode 30 is disposed on the forward direction Df side of the first tip 29 of the center electrode 20, and the second tip 39 faces the first tip 29 with the gap g provided therebetween. The second tip 39 is formed of a material (e.g., a noble metal such as iridium (Ir) or platinum (Pt), tungsten (W), or an alloy containing at least one of these metals) superior to the body portion 37 in durability against discharge.

The body portion 37 has an outer layer 31 and an inner layer 32 disposed on the inner-circumference side of the outer layer 31. The outer layer 31 is formed of a material (e.g., an alloy containing nickel) superior to the inner layer 32 in oxidization resistance. The inner layer 32 is formed of a material (e.g., pure copper or a copper alloy) higher in thermal conductivity than the outer layer 31. At least one of the inner layer 32 and the second tip 39 may be omitted.

FIG. 1 illustrates a forward-end portion length L. The forward-end portion length L corresponds to the distance between the forward-end portion of the seating surface 54s and the forward end of the metallic shell 50 in a direction parallel with the axial line CL. The forward-end portion of the seating surface 54s is a forwardmost portion of the seating surface 54s located on the forward-end direction Df side. In general, the larger the forward-end portion length L, the longer the threaded portion 57.

FIG. 1 includes, on its left side, an enlarged view illustrating a portion of the metallic shell 50, which portion includes the buckling portion 58. The enlarged view illustrates a thickness T. The thickness T corresponds to the thickness (in a direction perpendicular to the axial line CL) of a portion 58w of the buckling portion 58 having the largest outer diameter. The metallic shell 50 has different radial thicknesses at different portions of the metallic shell 50. For example, the thickness of the trunk portion 52 is larger than that of the buckling portion 58. In general, if the buckling portion 58 has a large thickness T, another portion of the metallic shell 50 (e.g., the trunk portion 52) also has a large thickness. Thus, the thickness T of the buckling portion 58 can be used as an index representing the thickness of the metallic shell 50 (e.g., the trunk portion 52).

A-2. Production Method for Metallic Shell 50:

The metallic shell 50 can be produced by any production method. For example, the metallic shell 50 may be produced by the following method. Firstly, a cylindrical metallic member is provided. The cylindrical member is then roughly shaped through cold forging. A hole corresponding to the through hole 59 is formed in the shaped member, to thereby prepare a tubular member. Subsequently, the outer and inner diameters of portions of the tubular member are adjusted through cutting so as to achieve the outer and inner diameters of the corresponding portions of the metallic shell 50. The trunk portion 52 of the member having adjusted outer and inner diameters is subjected to threading by means of dies, to thereby form the threaded portion 57. The metallic shell 50 is thereby produced.

Figure 2:
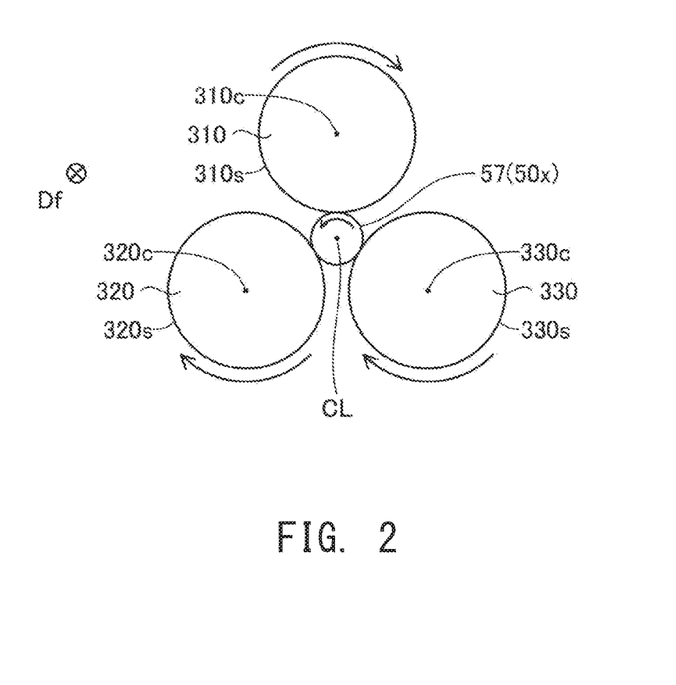
FIG. 2 is an explanatory view showing a threading process.

FIG. 2 illustrates a threading process for forming the threaded portion 57 of the metallic shell 50 (FIG. 1). FIG. 2 illustrates a metallic shell 50x under processing as viewed in the forward direction Df, and three threading dies 310 to 330 for forming the threaded portion 57 on the metallic shell 50x. The metallic shell 50x is a tubular member from which the metallic shell 50 (FIG. 1) is completed and extends along the axial line CL. The dies 310 to 330 are approximately cylindrical tools extending in parallel with the axial line CL of the metallic shell 50x. As shown in FIG. 2, the three dies 310 to 330, which are approximately equally spaced in a circumferential direction, are in contact with the outer circumferential surface of the metallic shell 50x. The outer circumferential surfaces 310s to 330s of the dies 310 to 330 are provided with a pattern reversed to that of the threaded portion 57 (i.e., external thread). While the metallic shell 50x is sandwiched between the three dies 310 to 330, the dies 310 to 330 are rotated about rotation axes 310c to 330c, respectively. This process forms the threaded portion 57 on the outer circumferential surface of the metallic shell 50x (this process for forming the threaded portion 57 may also be called "roll threading").

In some cases, in the cutting process before the threading process, chips generated as a result of the cutting process may adhere to a cutting tool, and the adhered chips may enter between the cutting tool and another metallic shell 50x, resulting in poor productivity. Alternatively, the metallic shell 50x (e.g., the trunk portion 52 on which the threaded portion 57 is to be formed) may be broken through the threading process. Thus, productivity may be reduced when a plurality of metallic shells 50x is processed one by one by means of the same tool. In an evaluation test described below, materials for the metallic shell 50 were examined in view of prevention of problems.

B. Evaluation Test:
B-1. First Evaluation Test:

The first evaluation test involved cutting and threading of a plurality of metallic shell 50x samples prepared from different materials. The metallic shell 50x samples were processed one by one by means of the same cutting tool for determining the presence or absence of problems caused by chips. Also, each of the threaded samples was visually observed for determining whether or not the metallic shell 50x was broken.

Figure 3:
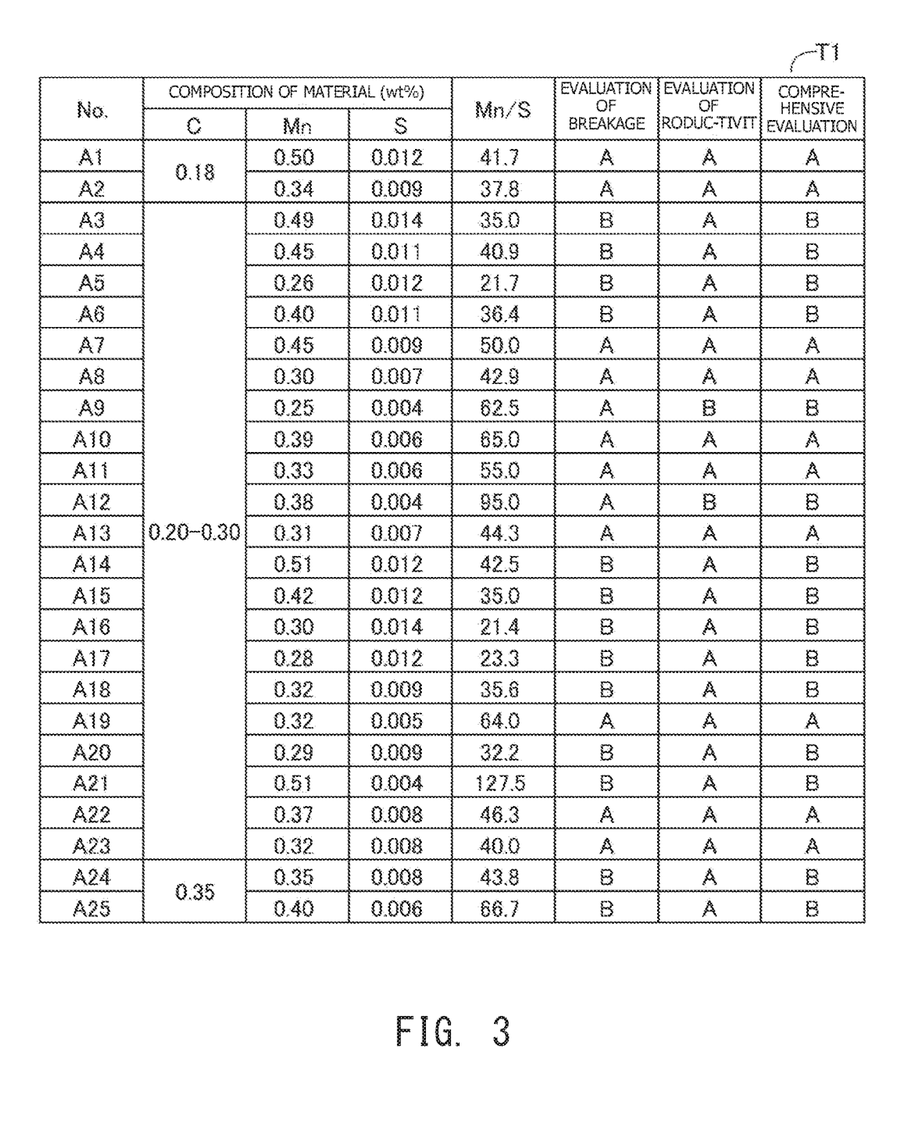
FIG. 3 is a table showing sample materials and the results of evaluation.

FIG. 3 (first table T1) shows sample materials and the results of evaluation. The material for the metallic shell 50x samples is carbon steel containing iron (main component), carbon C, manganese Mn, and sulfur S. First table T1 shows sample numbers, the carbon C, manganese Mn, and sulfur S contents (wt. %) of the material for the metallic shell 50x, the ratio of the manganese Mn content (wt. %) to the sulfur S content (wt. %) (i.e., Mn/S), the results of evaluation of breakage, the results of evaluation of productivity, and the results of comprehensive evaluation. In this evaluation test, the dies 310 to 330 were rotated at a rotation speed higher than that used for common processing of the metallic shell 50x. Thus, the threading was performed under conditions where problems are more likely to occur.

As shown in first table T1 (FIG. 3), 25 samples (samples A1 to A25) were evaluated in this evaluation test. At least one of the carbon C, manganese Mn, and sulfur S contents is different between these samples. The carbon C content and the manganese Mn content were respectively adjusted by controlling the amounts of carbon C and manganese Mn incorporated into the raw material. The sulfur S content was adjusted by controlling the degree of removal of sulfur S contained as an impurity in the raw material. The parameters other than these contents were common between the samples. For example, the threaded portion 57 of the metallic shell 50 had a nominal diameter of M12 and a forward-end portion length L of 28 mm. The material for sample A3 is an example of common carbon steel.

The results of evaluation of each sample show the results of cutting and threading of 10 samples prepared from the same material. Regarding the results of evaluation of breakage, rating "A" refers to the case where no breakage occurred in all the 10 samples, and rating "B" refers to the case where breakage occurred in at least one sample. The results of evaluation of productivity show the results in the case where the same 10 samples were processed one by one. Regarding the results of evaluation of productivity, rating "A" refers to no occurrence of problems caused by chips, and rating "B" refers to occurrence of problems caused by chips (e.g., abnormal processing due to deposition of chips on the cutting tool) in at least one sample during cutting. If problems caused by chips occurred, the test was continued after removal of the chips. Regarding the results of comprehensive evaluation, rating "A" refers to assignment of rating "A" to both evaluations of breakage and productivity, and rating "B" refers to assignment of rating "B" to at least one of evaluations of breakage and productivity.

As shown in first table T1 (FIG. 3), sample A1 or A2 had a carbon C content of 0.18 wt. %, which was lower than that of the other samples. The metallic shell 50 produced from sample A1 or A2 was soft and did not have a practical hardness. Samples A3 to A23 had a carbon C content of 0.20 wt % to 0.30 wt. %, and the metallic shell 50 produced from each of samples A3 to A23 had a practical hardness. Sample A24 or A25 had a carbon C content of 0.35 wt. %, which was higher than that of the other samples. Sample A24 or A25 was excessively hard, and rating "B" was assigned to evaluation of breakage. Thus, the carbon C content is preferably 0.20 wt. % to 0.30 wt. %.

Among samples A3 to A23 (wherein the carbon C content falls within the aforementioned preferred range), samples A7, A8, A10, A11, A13, A19, A22, and A23 exhibited rating "A" in comprehensive evaluation. In these samples, the manganese Mn content, the sulfur S content, and the content ratio (Mn (wt. %)/S (wt. %)) were as follows: 0.30 wt. %≤manganese Mn content≤0.45 wt. %, 0.005 wt. %≤sulfur S content≤0.009 wt. %, and 40≤content ratio (Mn/S)≤65.

Samples A5, A17, and A20 (wherein the manganese Mn content was less than 0.30 wt. %) exhibited rating "B" in evaluation of breakage. This is probably because the metallic shell 50x becomes brittle due to a low manganese Mn content. Meanwhile, samples A3, A14, and A21 (wherein the manganese Mn content was more than 0.45 wt. %) exhibited rating "B" in evaluation of breakage. This is probably because the metallic shell 50x hardens excessively due to a high manganese Mn content, and thus the metallic shell 50x becomes easy to break.

Samples A9 and A12 (wherein the sulfur S content was less than 0.005 wt. %) exhibited rating "B" in evaluation of productivity. This is probably because the metallic shell 50x softens due to a low sulfur S content, and thus soft chips are readily deposited on the cutting tool. Meanwhile, samples A3 to A6 and A14 to A17 (wherein the sulfur S content was more than 0.009 wt. %) exhibited rating "B" in evaluation of breakage. Among these samples, samples A4, A6, A15, and A16 (wherein the manganese Mn content falls within a range of 0.30 wt. % to 0.45 wt. %, which corresponds to rating "A" in comprehensive evaluation described above) exhibited rating "B," probably because the metallic shell 50x becomes brittle due to a high sulfur S content, resulting in breakage of the metallic shell.

Samples A3, A5, A6, A15 to A18, and A20 (wherein the content ratio was less than 40) exhibited rating "B" in evaluation of breakage. This is probably because a low content ratio (i.e., a high ratio of sulfur S content to manganese Mn content) results in brittleness of the metallic shell 50x. Samples A12 (wherein the content ratio was more than 65) exhibited rating "B" in evaluation of productivity, and sample A21 (wherein the content ratio was more than 65) exhibited rating "B" in evaluation of breakage. This is probably because a high ratio of manganese Mn content to sulfur S content may lead to hardening of the metallic shell 50x, resulting in ease of breakage of the metallic shell 50x, whereas a low ratio of sulfur S content to manganese Mn content may lead to softening of the metallic shell 50x, resulting in ease of deposition of soft chips on the cutting tool.

Thus, the material for the metallic shell 50 (and thus the metallic shell 50) preferably satisfies the following conditions 1 to 5: (condition 1) containing iron Fe as a main component; (condition 2) containing carbon C in an amount of 0.20 wt. % to 0.30 wt. %; (condition 3) containing manganese Mn in an amount of 0.30 wt. % to 0.45 wt. %; (condition 4) containing sulfur S in an amount of 0.005 wt. % to 0.009 wt. %; and (condition 5) content ratio (Mn/S) of 40 to 65.

The aforementioned preferred sulfur S content is lower than the sulfur S content (e.g., 0.01 wt. % or more) of the material for sample A3 (i.e., common carbon steel). In general, such a low sulfur S content leads to softening of the material, resulting in ease of deposition of chips on the tool. Under the aforementioned preferred conditions 1 to 5, the sulfur S content and the manganese Mn content are appropriately balanced, to thereby prevent both problems caused by chips and breakage of the metallic shell 50x.

The upper and lower limits of the preferred range (specifically, a range between the lower limit and the upper limit) of each of the aforementioned four parameters (i.e., carbon C content, manganese Mn content, sulfur S content, and content ratio (Mn/S)) may be appropriately selected from the values of the parameters corresponding to samples A7, A8, A10, A11, A13, A19, A22, and A23, which exhibited good results of comprehensive evaluation as shown in first table T1. The samples exhibiting good results of comprehensive evaluation had manganese Mn contents of 0.30, 0.31, 0.32, 0.33, 0.37, 0.39, and 0.45. The upper and lower limits of the preferred range of manganese Mn content can be appropriately selected from these values. The samples exhibiting good results of comprehensive evaluation had sulfur S contents of 0.005, 0.006, 0.007, 0.008, and 0.009. The upper and lower limits of the preferred range of sulfur S content can be appropriately selected from these values. The samples exhibiting good results of comprehensive evaluation had content ratios (Mn/S) of 40.0, 42.9, 44.3, 46.3, 50.0, 55.0, 64.0, and 65.0. The upper and lower limits of the preferred range of content ratio (Mn/S) can be appropriately selected from these values.

The aforementioned preferred conditions for the components of the metallic shell 50 probably achieve good results of evaluation of breakage and productivity, regardless of the shape and size of the metallic shell. Therefore, the aforementioned preferred conditions are applicable to metallic shells having different shapes and sizes. For example, the threaded portion 57 may have any nominal diameter other than M12, and the forward-end portion length L may be any value other than 28 mm.

Figure 4A:
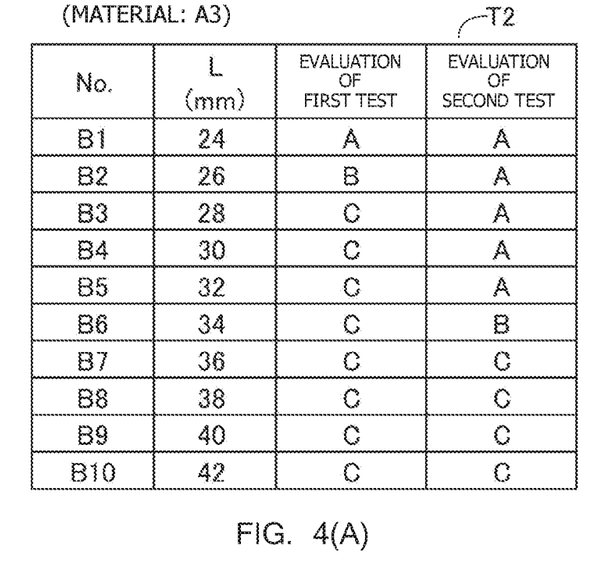
FIGS. 4(A) and 4(B) are tables showing sample configurations and the results of evaluation.
Figure 4B:
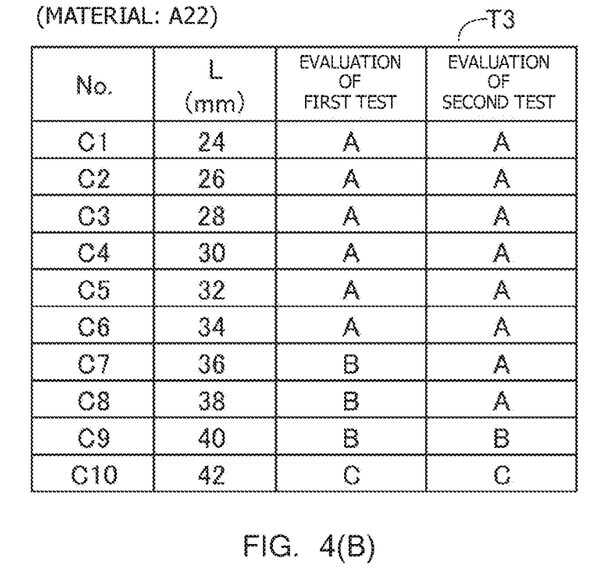

B-2. Second Evaluation Test:

The second evaluation test involved threading (see FIG. 2) of a plurality of metallic shell 50x samples having different forward-end portion lengths L (FIG. 1). Each of the threaded samples was visually observed for determining whether or not the metallic shell 50x was broken. FIGS. 4A and 4B (tables T2 and T3) show sample numbers, forward-end portion lengths L, the evaluation results of the first test, and the evaluation results of the second test. Second table T2 (FIG. 4A) shows the case involving the use of the material for sample A3 (i.e., common carbon steel shown in FIG. 3). Third table T3 (FIG. 4B) shows the case involving the use of the material for sample A22 (an example of the material satisfying the preferred conditions 1 to 5 described in FIG. 3). The tests were performed on 10 samples having forward-end portion lengths L of 24 mm, 26 mm, 28 mm, 30 mm, 32 mm, 34 mm, 36 mm, 38 mm, 40 mm, and 42 mm. In the first test, the dies 310 to 330 were rotated at a rotation speed higher than that used for common processing of the metallic shell 50x. In the second test, the dies 310 to 330 were rotated at a common rotation speed. Thus, the first test was performed under conditions where problems are more likely to occur, as compared with the second test. The parameters other than the material were common between samples B1 to B10 shown in second table T2 and samples C1 to C10 shown in third table T3. For example, the threaded portion 57 had a nominal diameter of M12.

The results of the first and second tests show the results of threading of 10 samples having the same configuration. Rating "A" refers to the case where neither "breakage" nor "wrinkles" occurred in all the 10 samples. The term "wrinkles" as used herein refers to a trace of stretching of the material. Wrinkles may occur through stretching of the outer circumferential surface of the metallic shell 50x by the dies 310 to 330. Occurrence of wrinkles, which differ from breakage, causes no practical problem. Rating "B" refers to the case where no "breakage" occurred in all the 10 samples, but "wrinkles" occurred in one or more samples. Rating "C" refers to the case where "breakage" occurred in one or more samples.

As shown in second table T2 (FIG. 4A), in the case involving the use of the material for sample A3 (i.e., common carbon steel), the sample wherein L=24 mm exhibited rating "A." the sample wherein L=26 mm exhibited rating "B," and the samples wherein L≥28 mm exhibited rating "C" in the first test. In the second test, the samples wherein L≤32 mm exhibited rating "A." the sample wherein L=34 mm exhibited rating "B," and the samples wherein L≥36 mm exhibited rating "C." Thus, poor rating was given in the case of a large forward-end portion length L. A possible reason for this is as follows. Since a large forward-end portion length L leads to a large contact area between the metallic shell 50x and the dies 310 to 330, strict conditions are required for roll threading. Therefore, a large force is applied from the dies 310 to 330 to the entire metallic shell 50x. Consequently, breakage or wrinkles may easily occur in the metallic shell 50x.

As shown in third table T3 (FIG. 4B), in the case involving the use of the material for sample A22, the samples wherein L≤34 mm exhibited rating "A," the samples wherein 36 mm≤L≤40 mm exhibited rating "B," and the sample wherein L=42 mm exhibited rating "C" in the first test. In the second test, the samples wherein L≤38 mm exhibited rating "A," the sample wherein L=40 mm exhibited rating "B," and the sample wherein L=42 mm exhibited rating "C."

As described above, in the case involving the use of the preferred material (sample A22), a considerably large forward-end portion length L achieved good results of evaluation, as compared with the case involving the use of a common material (sample A3). Specifically, in the first test, the results of evaluation in the case of the material for sample A22 were superior to those in the case of the material for sample A3 when the forward-end portion length L fell within a range of 26 mm to 40 mm. For example, sample C5 (L=32 mm) exhibited rating "A" as shown in third table T3 (FIG. 4B), which was better than the rating "C" of sample B5 (L=32 mm) as shown in second table T2 (FIG. 4A). Similar results were obtained in the case of another forward-end portion length L.

As shown in FIG. 3, not only the material for sample A22 but also materials satisfying the aforementioned preferred conditions 1 to 5 achieved good results of evaluation of breakage and productivity. Thus, when the forward-end portion length L falls within a range of 26 mm to 40 mm, the use of the material for sample A22 or any material satisfying the aforementioned preferred conditions 1 to 5 can probably prevent problems during threading (e.g., breakage or wrinkles), as compared with the case involving the use of common carbon steel.

In the second test, the results of evaluation in the case of the material for sample A22 were superior to those in the case of the material for sample A3 when the forward-end portion length L fell within a range of 34 mm to 40 mm. For example, sample C7 (L=36 mm) exhibited rating "A" as shown in third table T3 (FIG. 4B), which was better than the rating "C" of sample B7 (L=36 mm) as shown in second table T2 (FIG. 4A). Similar results were obtained in the case of another forward-end portion length L.

As shown in FIG. 3, not only the material for sample A22 but also materials satisfying the aforementioned preferred conditions 1 to 5 achieved good results of evaluation of breakage and productivity. Thus, when the forward-end portion length L falls within a range of 34 mm to 40 mm, the use of the material for sample A22 or any material satisfying the conditions 1 to 5 can probably prevent problems during threading (e.g., breakage or wrinkles) even under conditions where problems are likely to occur, as compared with the case involving the use of common carbon steel.

In the case where the shape and size of the metallic shell differs from those of a sample (e.g., the threaded portion 57 does not have a nominal diameter of M12), the use of a material satisfying the conditions 1 to 5 can probably prevent problems. If the forward-end portion length L is less than 26 mm or more than 40 mm, a material satisfying the aforementioned preferred conditions 1 to 5 may be used.

Figure 5A:
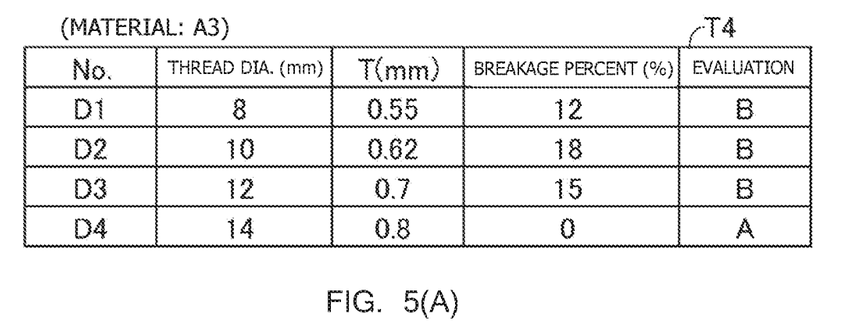
FIGS. 5(A) and 5(B) are tables showing sample configurations and the results of evaluation.
Figure 5B:
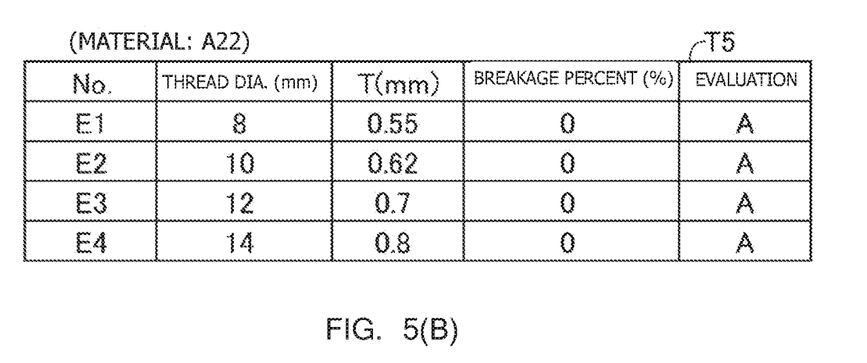

B-3. Third Evaluation Test:

The third evaluation test involved threading (see FIG. 2) of a plurality of metallic shell 50x samples having different nominal diameters (may also be called "thread diameters") of the threaded portion 57 of the metallic shell 50. Each of the threaded samples was visually observed for determining whether or not the metallic shell 50x was broken. FIGS. 5A and 5B (tables T4 and T5) show sample numbers, thread diameters, thicknesses T (FIG. 1), breakage percentages, and the results of evaluation. Fourth table T4 (FIG. 5A) shows the case involving the use of the material for sample A3 (FIG. 3) (i.e., common carbon steel). Fifth table T5 (FIG. 5B) shows the case involving the use of the material for sample A22 (an example of the material satisfying the preferred conditions 1 to 5 described in FIG. 3). The test was performed on four samples having thread diameters of 8, 10, 12, and 14 (mm). The larger the thread diameter, the larger the thickness T. In this evaluation test, the dies 310 to 330 were rotated at a rotation speed higher than that used for common processing of the metallic shell 50x. The threading was performed on 100 samples. The "breakage percentage" refers to the percentage (%) of samples in which breakage occurred among the 100 samples. Regarding the results of evaluation, rating "A" refers to a breakage percentage of 0%, and rating "B" refers to a breakage percentage of more than 0%. The parameters other than the material were common between samples D1 to D4 shown in fourth table T4 and samples E1 to E4 shown in fifth table T5. For example, the forward-end portion length L was 28 mm.

As shown in fourth table T4 (FIG. 5A), in the case involving the use of the material for sample A3 (i.e., common carbon steel), the sample wherein thread diameter=14 mm exhibited rating "A," and the samples wherein thread diameter ≤12 mm exhibited rating "B." Thus, the metallic shell 50x is easily broken in the case of a small thread diameter, since a small thread diameter leads to a decrease in the thickness of the metallic shell 50 (e.g., the thickness T of the buckling portion 58), resulting in reduced durability of the metallic shell 50x.

As shown in fifth table T5 (FIG. 5B), in the case involving the use of the material for sample A22, all the samples exhibited rating "A" regardless of thread diameter. In the case involving the use of the preferred material (sample A22), a considerably small thread diameter achieved good results of evaluation, as compared with the case involving the use of a common material (sample A3). Specifically, the results of evaluation in the case of the material for sample A22 were superior to those in the case of the material for sample A3 when the thread diameter was 12 mm (M12), 10 mm (M10), or 8 mm (M8). For example, sample E1 (M8) exhibited rating "A" as shown in fifth table T5 (FIG. 5B), which was better than the rating "B" of sample D1 (M8) as shown in fourth table T4 (FIG. 5A). Similar results were obtained in the case of another thread diameter.

As shown in FIG. 3, not only the material for sample A22 but also materials satisfying the aforementioned preferred conditions 1 to 5 achieved good results of evaluation of breakage and productivity. Thus, when the thread diameter is M12, M10, or M8, the use of the material for sample A22 or any material satisfying the conditions 1 to 5 can probably prevent problems during threading (e.g., breakage) even under conditions where problems are likely to occur, as compared with the case involving the use of common carbon steel.

In the case where the shape and size of the metallic shell differs from those of a sample (e.g., the forward-end portion length L is not 28 mm), the use of a material satisfying the conditions 1 to 5 can probably prevent problems. If the threaded portion 57 does not have a thread diameter of M12, M10, or M8 (e.g., the thread diameter is more than M12 or less than M8), a material satisfying the aforementioned preferred conditions 1 to 5 may be used.

C. Modification (1) The material for the metallic shell 50 satisfying the aforementioned preferred conditions 1 to 5 may be any material satisfying the conditions 1 to 5 other than the materials for the samples shown in FIG. 3. As described in FIG. 3, the ranges represented by the conditions 1 to 5 correspond to the ranges of parameters (specifically, carbon C content, manganese Mn content, sulfur S content, and content ratio (Mn/S)) of samples exhibiting good results of evaluation of breakage and productivity. Thus, when these parameters fall within the ranges represented by the aforementioned preferred conditions 1 to 5, the resultant metallic shell probably exhibits good results of evaluation of breakage and productivity without a considerable variation in results. In any case, when the metallic shell satisfies the conditions 1 to 5, the material for the metallic shell also satisfies the conditions 1 to 5, thereby preventing a reduction in the strength of the metallic shell and a reduction in productivity.

(2) The metallic shell 50 may be produced by any method in place of the aforementioned production method. For example, a member may be prepared through forging before adjustment of the outer and inner diameters of the member by a cutting process. In any case, the production of the metallic shell 50 through cutting may cause problems due to chips. The use of a material satisfying the aforementioned preferred conditions 1 to 5 can prevent breakage of the metallic shell 50x while preventing problems caused by chips.

(3) The ignition plug can have any configuration other than the configuration described in FIG. 1. For example, a discharge gap may be provided between the ground electrode and a side surface (a surface in a direction perpendicular to the axial line CL) of the center electrode. The total number of discharge gaps may be two or more. The resistor 73 may be omitted. A magnetic material may be disposed between the center electrode 20 and the metallic terminal member 40 in the through hole 12 of the insulator 10. The entire center electrode 20 may be disposed within the through hole 12 of the insulator 10. The entire metallic terminal member 40 may be disposed within the through hole 12 of the insulator 10.

The present invention has been described with reference to the embodiments and modifications. The aforementioned embodiments are provided to facilitate understand the invention, but are not meant to limit the invention. The present invention may be modified or improved without departing from the gist thereof and the scope of the appended claims, and encompasses equivalents thereof.

DESCRIPTION OF REFERENCE NUMERALS

8: forward-end-side packing; 10: insulator; 10e: rear end; 11: inner-diameter-reducing portion; 12: axial hole (through hole); 13: rear-end-side trunk portion; 14: large-diameter portion; 15: forward-end-side trunk portion; 16: outer-diameter-reducing portion; 19: leg portion; 20: center electrode; 21: outer layer; 22: core; 24: head portion; 27: shaft portion; 29: first tip; 30: ground electrode; 31: outer layer; 32: inner layer; 33: one-end portion; 33: proximal end portion; 34: distal end portion; 37: body portion; 39: second tip; 40: metal terminal member; 41: shaft portion; 48: collar portion; 49: cap attachment portion; 50, 50x: metallic shell; 51: tool engagement portion; 52: trunk portion; 53: crimp portion; 54: collar portion; 54s: seating surface; 55: forward end surface; 56: inner-diameter-reducing portion; 57: threaded portion; 58: buckling portion; 59: through hole; 61: ring member, 70: talc; 72: first seal; 73: resistor; 74: second seal; 90: gasket; 100: ignition plug; 300: connection member; 310 to 330: die; 310c to 330c: rotation axis; 310s to 330s: outer circumferential surface; g: gap; L: forward-end portion length; CL: center axis (axial line); Df: forward-end direction (forward direction); and Dfr: rear-end direction (rearward direction).

Having described the invention, the following is claimed:

1. An ignition plug comprising:
a tubular metallic shell extending in a direction of an axial line, wherein
the metallic shell contains iron as a main component, carbon in an amount of 0.20 wt. % to 0.30 wt. %, manganese in an amount of 0.30 wt. % to 0.45 wt. %, and sulfur in an amount of 0.005 wt. % to 0.009 wt. %, and
the ratio of the manganese content (wt. %) to the sulfur content (wt. %), the ratio being represented by Mn/S, is 40 to 65.

2. An ignition plug according to claim 1, wherein
the metallic shell has, on an outer circumferential surface thereof, a seating surface protruding radially outward and a threaded portion provided on a forward end side of the seating surface in the direction of the axial line, and
the distance, in the direction of the axial line, between a forward-end portion of the seating surface and a forward end of the metallic shell is 26 mm to 40 mm.

3. An ignition plug according to claim 2, wherein
the distance is 34 mm to 40 mm.

4. An ignition plug according to claim 3, wherein the threaded portion has a nominal diameter of M12, M10, or M8.

5. An ignition plug according to claim 2, wherein the threaded portion has a nominal diameter of M12, M10, or M8.

* * * * *